Feb. 21, 1956
F. H. McCLERNON
2,735,651
TRACTOR ATTACHMENT
Filed Oct. 8, 1953
3 Sheets-Sheet 1
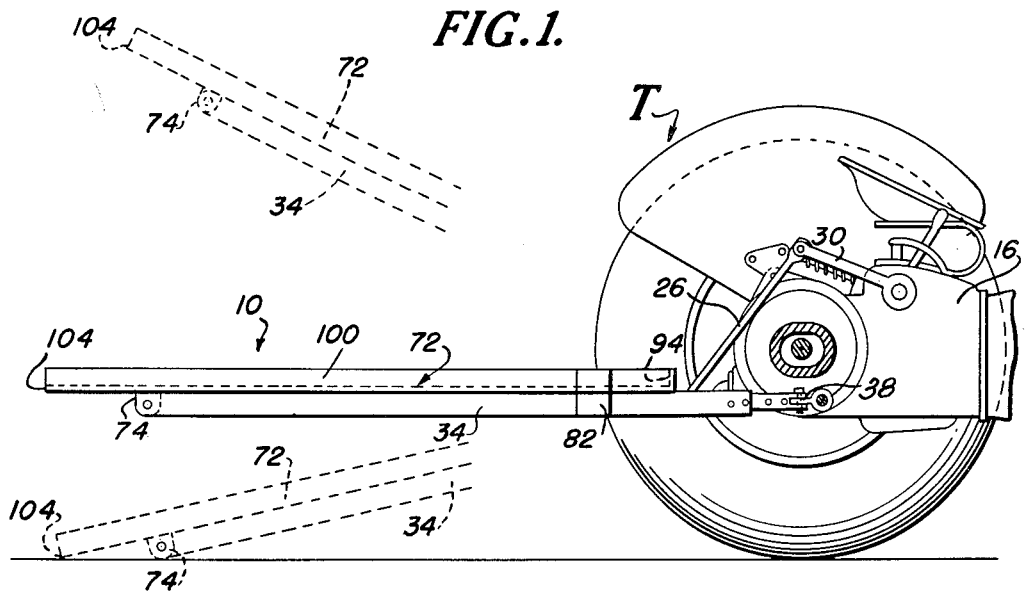
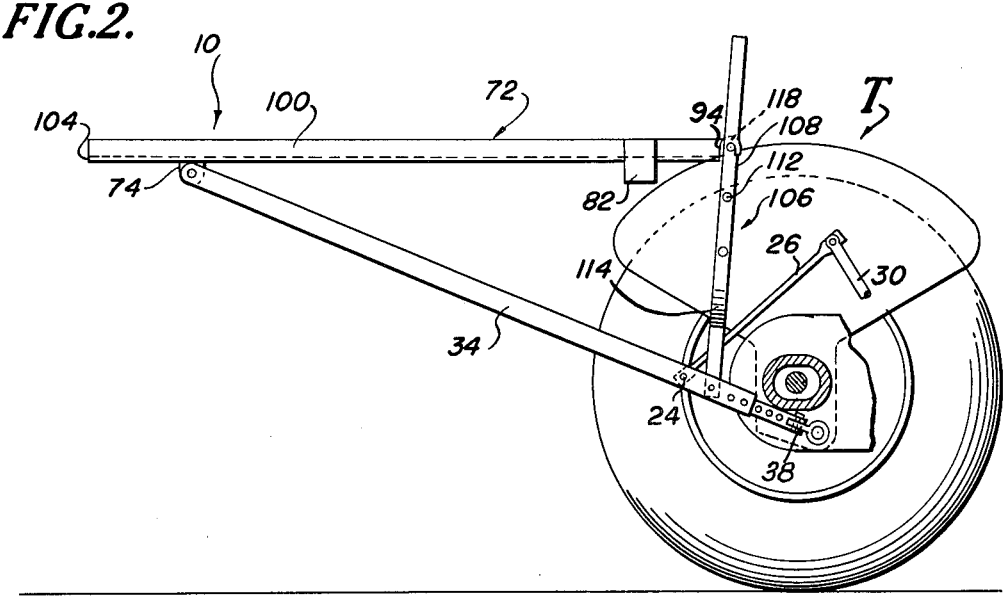
INVENTOR
Francis H. McClernon
BY Cushman, Darby & Cushman
ATTORNEYS Feb. 21, 1956   F. H. McCLERNON   2,735,651
TRACTOR ATTACHMENT
Filed Oct. 8, 1953   3 Sheets-Sheet 2

INVENTOR
*Francis H. McClernon*
BY *Cushman, Darby & Cushman*
ATTORNEYS

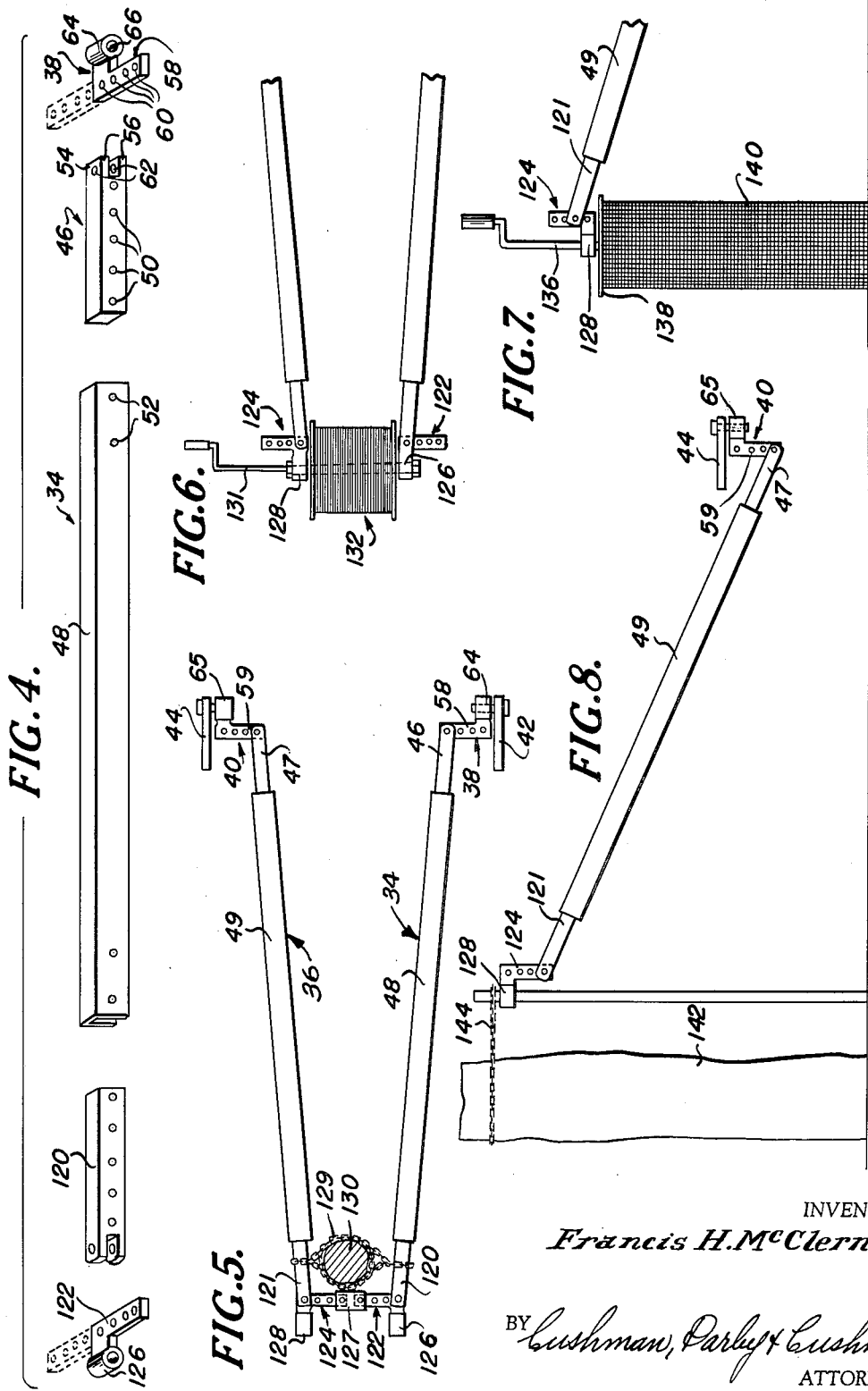

United States Patent Office 2,735,651
Patented Feb. 21, 1956

2,735,651

TRACTOR ATTACHMENT

Francis H. McClernon, Springfield, Mo.

Application October 8, 1953, Serial No. 384,875

13 Claims. (Cl. 254—124)

This invention pertains to new and useful improvements in attachments for tractors, and in particular to attachments for use with tractors equipped with a Ferguson type of draft mechanism or similar system of linkage adaptable to Ford or Ferguson and similar type tractors.

One of the principal objects of this invention is to provide a detachable transport platform or bed which may be secured to a tractor without affecting in any way the construction or usefulness of the latter and which when so secured will form an integral part of the tractor.

Another object of this invention is to provide a portable transport platform, or box which is readily attachable to a tractor for loading, hauling and depositing substantially heavy loads of sack feed, loose corn, stones, tools, cord wood, milk cans and other similar types of loads normally encountered in farming and other occupations.

It is another object of this invention to provide a transport platform which may be readily secured on the power lift arms of a hydraulic lift mechanism for lowering or elevating the platform with respect to a tractor in order to facilitate loading the platform and transporting the load from place to place.

It is still another object of this invention to provide a work load platform for attachment to a tractor which will not tend to tip due to an uneven load distribution on the platform.

It is an important object of this invention to provide a transport platform which may be readily attached to a tractor and which is pivotally secured to its tractor attaching means at the rear end of the platform whereby a load may be quickly dumped from the platform by pivoting the platform upwardly and outwardly away from the tractor.

It is another important object of this invention to provide a platform for attachment to a tractor which may be elevated substantially above the level of the tractor and which may be maintained level at any desired elevation or may be adjusted to any required inclination in order to facilitate loading or unloading of the platform.

It is still another important object of this invention to provide an attachment for tractors employing a Ferguson type system of draft linkage wherein the draw bars of this system are employed to act as stablizers for the present invention.

A further object of this invention is to provide an attachment for tractors to be secured to the standard hydraulic draft mechanism common to present day tractors, comprising a pair of rearwardly extending rails adaptable for fence post pulling operations and the like.

It is a further object of this invention to provide an attachment for tractors equipped with hydraulically operated draw bars which are adapted to carry implements such as crop spraying rigs, rotatably mounted clod breaking devices, rotatably mounted elongated chicken wire spools and the like.

It is a still further object of this invention to provide an attachment for tractors adapted to mount fence wire spools and the like thereto for rotatable contact with the ground, whereby wire may be wound or unwound upon the spool as forward motion is imparted to the tractor.

With the above objects in view the invention consists in the combination of parts and members such as described in the following specification, shown in the accompanying drawings and enumerated in the claims, and it is to be understood that the modifications shown are merely illustrative and are not intended to limit the scope of the invention but merely to illustrate the manner in which it is to be carried into effect.

The following detailed specification has reference to the accompanying drawings, in which:

Figure 1 is a side elevation of a preferred embodiment of the platform employed in this invention showing how the platform may be inclined upwardly or downwardly from the horizontal to facilitate loading or unloading.

Figure 2 is a side elevation of the invention similar to that of Figure 1, but showing the platform in an elevated level position.

Figure 4 is an exploded perspective view of one of the platform supporting rails employed in the invention.

Figure 5 is a detail plan view of the post pulling attachment employed with the invention.

Figure 6 is a detail plan view of a wire dispensing attachment.

Figure 7 is a detail plan view of a chicken wire spool attachment.

Figure 8 is a detail plan view of a clod breaking attachment to be used with the invention.

Figure 3:
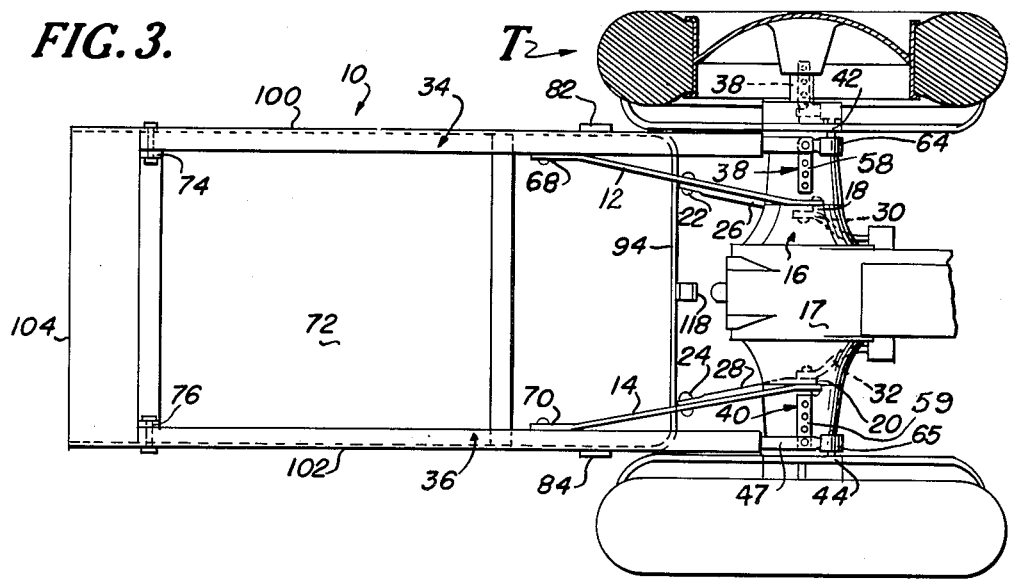
Figure 3 is a bottom plan view of a preferred embodiment of this invention showing more clearly the manner in which a standard hydraulic lift is integrated with the invention.

Referring now in greater detail to the drawings, a preferred embodiment of the invention 10 (Figures 1, 2 and 3) is shown mounted on a tractor T of any conventional or approved design, a Ferguson type tractor being represented in the drawings. Those details of the tractor which have no reference to the present invention are not described as it is to be understood that the construction of the tractor itself is known to persons skilled in the art and is not a part of the present specification.

A pair of draw bars 12 and 14 (Figure 3) operate simultaneously on opposite sides 18 and 20 of a hydraulic lift mechanism 16 adjoining the tractor rear axle housing 17, and are pivotally connected at points 22 and 24 intermediate their end portions with links 26 and 28 which are in turn pivotally connected to crank arms 30 and 32. The crank arms are pivotally connected adjacent opposite sides 18 and 20 of the hydraulic lift mechanism 16. Thus, when the hydraulic lift mechanism is operated, the draw bars 12 and 14 are rotated through different angular positions from a lowermost to an uppermost position. This described linkage is characteristic of the Ferguson type draw bar assemblies and is also well known to those persons skilled in the art.

A preferred embodiment of the present invention comprises a further attachment which is secured in part to the rear axle of the tractor and in part to the draw bar assembly. In this embodiment a pair of rails 34 and 36 (Figures 3 and 4) are pivotally secured to the underside of the tractor rear axle housing 17 by means of L-shaped brackets 38 and 40 which are pivotally connected to lugs 42 and 44 integral with the underside of the axle housing. Rail 34 comprises an extension bar 46 (Figure 4) and a U-shaped channel member 48, and the opposite rail 36 comprises a corresponding extension bar 47 and channel member 49. The extension bar is adapted to mate within the channel and holes 50 and 52 are formed in their respective parts so as to align when the members are engaged. Accordingly, the extension bar may be adjusted relative to the channel member in order to lengthen or shorten the overall length of the rail. The free end 54 of the extension bar is formed in the shape of a yoke 56 which is adapted to fit over the arm portion 58 of the L-shaped bracket 38, or over the corresponding portion 59 of bracket 40. A series of holes 60 are provided in this arm to align with holes 62 in the yoke whereby the yoke may be secured to the arm by any suitable fastening means (not shown). The arm is integral with a cylindrical boss 64 having a hole 66 provided therein to receive a bolt or other standard fastener for securing the bracket 38 to the tractor axle lug 42 whereby arm 58 will project parallel to the axis of the axle.

Rail 36 is identical in every respect to rail 34 described in detail hereinabove. Brackets 38 and 40 are reversible when required as shown by bracket 38 in phantom outline (Figures 3 and 4). It is to be noted that the draw bars 12 and 14 diverge rearwardly from the tractor until the diverging ends 68 and 70 of the draw bars make contact with the inside faces of the rails 34 and 36, respectively, where they are rigidly secured thereto. Because of the divergence of these draw bars the engagement of the outermost end of each draw bar to its respective rail and the innermost end to the tractor axle serves to make each draw bar function as a transverse stabilizer for its respective adjacent rail.

Figure 10:
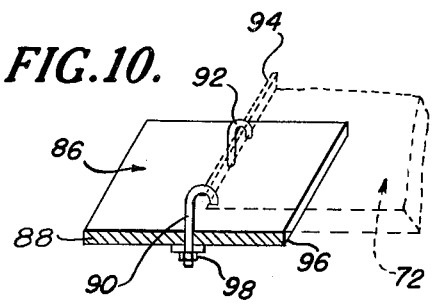
Figure 10 is a perspective view of an attachment which may be secured to the front end of the platform.

A platform 72 (Figures 1 and 2) is adapted to rest on the rails 34 and 36 and is pivotally secured thereto at its rearward end portion by a pair of ears 74 and 76 integrally secured thereto and projecting downwardly for pivotal connection with the adjacent rails so that the platform may be pivoted upwardly and rearwardly from the tractor. The forward portion of the platform is unrestrained relative to motion through a vertical plane but is secured against transverse movement when in the lowered position by means of a pair of brackets 82 and 84 depending therefrom for engagement with the outside faces of the rails. With the platform pivotally secured as aforesaid, a load on the platform will normally tend to hold the platform secure against the upper surface of the rails, there being almost no tendency to tip the platform rearwardly since the center of gravity of all usual loads will be forward of the pivotal ears 74 and 76. The platform may be adapted to receive stakes around its edges so as to serve as a stake body type bed. When the platform is fully loaded there is no place for an extra helper to stand or ride so a step 86 (Figure 10) may be secured to the forward edge of the main platform 72. This step comprises a small platform 88 having a pair of hook bolts 90 and 92 projecting upwardly through the platform for engagement about the platform rear transverse plate 94. A portion 96 of the step platform extends underneath the principal platform for contact with its under surface whereby the weight of a helper standing on the portion projecting forward of the main platform will set up a counter-clockwise movement which will hold the step firmly in place. The hook bolts 90 and 92 are tightened down on the platform by means of nuts 98.

In addition to the transverse plate 94, which projects upwardly from the platform, lips or retaining plates 100 and 102 (Figure 3) are secured to the opposite sides of the platform and project upwardly therefrom in cooperation with the transverse plate 94 to prevent a load from shifting over the side or forward edges of the platform. No similar lip or retaining plate is secured to the back edge 104 of the platform inasmuch as this would serve as an obstruction and a hindrance in loading and unloading operations.

In use, rotation of crank arms 30 and 32 causes draw bars 12 and 14 through links 26 and 28 to rotate upwardly or downwardly, and it may be readily be seen that such rotation will likewise cause the rails 34 and 36 and the platform 72 to be rotated through a similar arcuate path. Thus, if the crank arms are lowered the back edge 104 of the platform 72 (Figure 1) will be lowered until it makes contact with the ground whereupon heavy objects may be readily lifted onto the platform and when fully loaded, counter rotation of crank arms will lift the platform upwardly into a horizontal position for transportation of the load.

If it is desirable to unload a truck the tail gate of which is above the level of the platform, rotation of the crank arms so as to elevate the rearward end of the portion of the platform will bring this portion up to the level of the tail gate, whereupon heavy articles may be rolled or slid from the body of the truck onto the platform.

Figure 9:
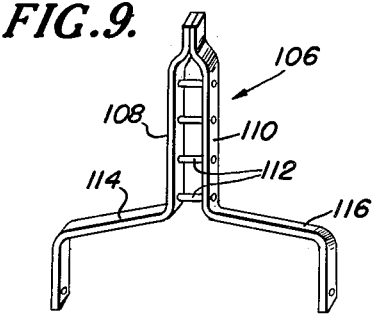
Figure 9 is a perspective view of the means for adjusting the inclination of the platform.

At times it may be desirable to carry the platform at an elevated horizontal position and accordingly a platform support 106 (Figures 2 and 9) is provided. This platform support comprises a pair of ladder-like side members 108 and 110 having a series of rungs 112 secured therebetween. The lower ends of the side members are integrally secured to a pair of transversely extending legs 114 and 116 which are pivotally secured to the inner faces of the rails intermediate ends 22 and 24 of links 26 and 28 and brackets 38 and 40, respectively (Figure 2). In the center of the transverse plate 94 of the platform 72 a hook bolt 118 or similar type bracket (Figures 2 and 3) is integrally secured thereto so that by placing the hook portion of the bolt over any selected rung 112 of the support 106 the inclination of the platform is accordingly adjusted. When the support is not in use it may be pivoted out of the way.

This invention has diversified utility about farms and in industry, and a transporting platform is but one embodiment of its many uses. For other chores, the platform may be removed and extension bars 120 and 121 (Figures 4 and 5) can be secured to the outermost ends of the channels. These extension bars will also have yokes formed in their free ends and adapted to secure like L-shaped brackets 122 and 124 therebetween.

One use for this embodiment comprises a convenient and novel means for performing such chores as lifting fence posts or similar objects out of holes or off of the ground. To adapt the invention for this form of work, the bosses 64 and 65 (Figure 5) of the L-shaped brackets 38 and 40 are placed on the inside faces of the axle lugs 42 and 44 (Figure 5) and pivotally secured thereto with the arms of the bracket extending inwardly therefrom. Where better alignment between the rails and the draw bars can be obtained, brackets 38 and 40 can be secured to the outside faces of lugs 42 and 44, whereby the arms 58 and 59 will project outwardly therefrom (see bracket 38 in phantom in Figures 3 and 4). The extension bars 46 and 47 are coupled to the outermost mating holes of each arm 58 and 59 and the brackets 122 and 124 are secured by the innermost portion of their arms to the extension bars 120 and 121 so that these arms extend inwardly. A plate 127 with aligned holes formed therein is placed over these arms and bolted thereto to form a rigid structural member across the outermost ends of the rail. If desirable to bring the outer ends of the rails even closer together, the arms may be overlapped, without the use of the linking plate and may be bolted or otherwise secured to each other in aligned position. A chain hitch 129 may then be attached adjacent the inside edges of brackets 122 and 124 intermediate the rails 34 and 36 and secured to the inside faces thereof for engagement about the periphery of cylindrical objects, such as fence posts 130. By elevating these rails by the means heretofore described, a fence post may be lifted out of a hole for further disposal, thereby eliminating the manual labor required to perform this task.

Figure 11:
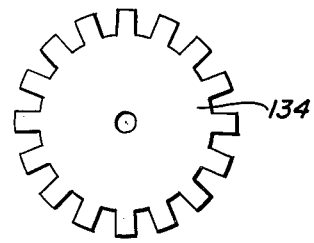
Figure 11 is a detail elevational view of a disk type cleat which may be integrally secured to opposite ends of spool attachments so as to cause the spools to rotate when lowered into contact with the ground.

A further use of these rails in the converging position may be made by reversing the position of the outermost L-shaped brackets 122 and 124, whereby their arms (Figure 6) are projecting outwardly from the longitudinal center line of the tractor. In this position the arms are free and clear of the space between the rails whereby an axle 131 may be journaled in the bosses 126 and 128 to carry a rotatable spool 132. A particular use for such a spool is found in winding and unwinding fence wire. When the wire is being unwound the spool can be carried above the ground by adjusting the rails to a substantially horizontal position. However, when it is necessary to rewind the fence wire on the spool the rails can be lowered to the ground and a pair of serrated disks 134 (Figure 11) may be rigidly secured to the opposite ends of the spool for rolling contact with the ground. Thus, as the tractor moves forward the serrations will dig into the ground and cause the spool to rotate rather than to slip or slide whereupon the fence wire will be wound onto the spool. Sufficient adjustment holes are provided in the arms so that rigid contact is maintained with the divergent ends of the draw bars at all times.

In a further embodiment of the invention, L-shaped brackets 38 and 40 are positioned with their bosses 64 and 65 bearing against the inner faces of the axle lugs 42 and 44 for pivotal securement thereto whereby the arms 58 and 59 project inwardly. Brackets 122 and 124 on the other end are positioned so that the arms are directed outwardly and are secured in the yokes of the extension bars 120 and 121. This provides a relative wide expansion between the bosses 126 and 128 for journaling an axle 136 (Figure 7) or other rig therebetween. Uses of this type of apparatus would be the rotatable mounting of an elongated spool 138 to carry materials, such as chicken wire mesh 140, which could not be attached to the arrangement set forth in the above embodiment of the invention.

By reversing brackets 122 and 124 (Figure 8) other attachments requiring relatively widely separated bosses 126 and 128 may also be mounted on this invention, such as a spray rig for going between rows of crops and spraying insecticides thereon. The wide expanse of these bosses may also be employed to advantage in dragging a clod breaker 142 therebehind without having the clod breaker twist or otherwise become entangled within its own gear 144 as would be the case if a narrower pair of brackets were employed for this hitch.

Thus, from the disclosures set forth hereinabove it will be apparent to those skilled in the art that the present invention teaches the use of a new and useful attachment to be employed in conjunction with a standard hydraulic draw bar lift available on most tractors. The invention is simple in design and easy to attach, yet it is rugged and exceedingly adaptable to service relative to many and varied chores to be encountered about a farm, and to various industrial applications.

It will thus be seen that there has been provided by this invention structure in which the various objects hereinbefore set forth, together with many practical advantages, are successfully achieved. As various possible embodiments may be made of the individual features of the above invention, all without departing from the scope thereof, it is to be understood that all matter hereinbefore set forth or shown in the accompanying darwings is to be interpreted as illustrative, and not in a limiting sense.

I claim:

1. For use on a tractor equipped with a Ford-Ferguson type draw-bar assembly, an attachment comprising a pair of rearwardly extending rails pivotally secured at their near ends to the underside of the rear axle of said tractor and rigidly secured at substantially their mid-portions to said draw bar assembly, and a platform resting on the upper edges of said rails, the far end of said platform being pivotally secured to the far ends of said rails.

2. For use with a tractor having a pair of laterally spaced, power-rotated crank-arms, a pair of laterally spaced draw bars pivotally secured to the rear of said tractor and a pair of links connecting the outer ends of said crank-arms to the mid-points of said draw bars respectively, the improvement comprising a pair of laterally spaced rearwardly extending rails adapted to be pivotally secured to the underside of the rear axle of said tractor, said rails being adapted to be secured intermediate their end portions to the far ends of said draw bars, and a platform resting on the upper edges of said rails and pivotally secured to the far ends thereof.

3. The apparatus set forth in claim 2, wherein said draw bars diverge rearwardly from said tractor and are rigidly connected to said rails to stabilize said rails against transverse deflection.

4. The apparatus set forth in claim 2, including a pair of brackets mounted on opposite sides of said platform and depending therefrom to contact the outside faces of said rails whereby said brackets stabilize said platform against transverse deflection.

5. The apparatus set forth in claim 2 wherein each of said rails is adjustable and comprise a structural channel member, an L-shaped tractor mounting bracket, an extension bar adapted on one end to couple with said bracket and having means along its longitudinal axis for extensible engagement with one end of said channel member, and one arm of said L-shaped bracket extending parallel to said tractor axle, said bracket being reversibly mountable so as to reverse the direction of projection of said arm.

6. The device set forth in claim 2 including means for adjusting the inclination of said platform comprising a hook secured to the forward edge of said platform, and a ladder-like bracket supporting a series of rungs, the base of said bracket being integral with a pair of transversely extending legs pivotally secured to opposite sides of said rails, whereby said hook may alternately engage any of said rungs to support said platform spaced from said rails.

7. The device set forth in claim 2, including an auxiliary platform intermediate said rails and secured to the forward edge of said platform, whereby footing is provided for use when said platform is fully loaded.

8. The device set forth in claim 2, including a lip extending upwardly from the front and sides of said platform.

9. For use on a tractor equipped with a Ford-Ferguson type draw-bar assembly, an attachment comprising a pair of rearwardly extending rails pivotally secured at their near ends to the underside of the rear axle of said tractor and rigidly secured to adjacent Ford-Ferguson assembly type draw bars at the respective mid-portions of said rails, wherein each of said rails is adjustable laterally and longitudinally and comprises a structural U-shaped channel member, a pair of L-shaped mounting brackets, and a pair of extension bars having means along their longitudinal axes for adjustable mating engagement each with an opposite end of said channel member, one arm of each of said L-shaped brackets extending parallel to said tractor axle and being adapted to couple with one of said extension bars, said brackets being reversibly mountable so as to reverse the direction of projection of each arm.

10. The device set forth in claim 9, wherein said arms of said L-shaped brackets adjacent the tractor axle project inwardly toward the longitudinal axis of the tractor, and the arms of said L-shaped brackets secured to the far ends of said rails project inwardly toward the longitudinal axis of the tractor, whereby said last named arms are disposed to support an appliance therebetween.

11. The device set forth in claim 9, wherein said arms of said L-shaped brackets secured to the far ends of said rails project outwardly from the longitudinal axis of said tractor, the other arms of said brackets extend rearwardly from said tractor, said other arms being adapted to support an applicance therebetween.

12. The device set forth in claim 9, wherein said arms of said L-shaped brackets secured to the far ends of said rails project inwardly toward the longitudinal axis of said tractor, and the other arms of said brackets extend rearwardly from said tractor, said other arms being adapted to support an appliance therebetween.

13. For use on a tractor equipped with a Ford-Ferguson type draw-bar assembly, an attachment comprising a pair of rearwardly extending rails pivotally secured at their near ends to the underside of the rear axle of said tractor and secured at substantially their mid-portions to said draw-bar assembly, wherein each of said rails is adjustable laterally and longitudinally and comprises a structural U-shaped channel member, an L-shaped mounting bracket, and an extension bar having means along its longitudinal axis for adjustable mating engagement with said channel member, one arm of said L-shaped bracket extending parallel to said tractor axle and being adapted to couple with said extension bar, the other arm of said bracket being mounted in pivotal fashion on the underside of said tractor axle, said bracket being reversibly mountable so as to reverse the direction of projection of said first-mentioned arm.

References Cited in the file of this patent
UNITED STATES PATENTS

| | | |
|---|---|---|
| 2,554,900 | Davies | May 29, 1951 |
| 2,591,435 | Hunsaker et al. | Apr. 1, 1952 |
| 2,630,930 | Ulrich | Mar. 10, 1953 |
| 2,659,572 | Steer | Nov. 17, 1953 |